June 22, 1943.　　　A. M. GOODLOE　　　2,322,513
REMOVABLE FILTER UNIT FOR AIR CLEANERS
Filed Feb. 10, 1942　　　2 Sheets-Sheet 1

INVENTOR.
Alfred M. Goodloe,
BY George D. Richards
ATTORNEY.

June 22, 1943.　　　　A. M. GOODLOE　　　　2,322,513
REMOVABLE FILTER UNIT FOR AIR CLEANERS
Filed Feb. 10, 1942　　　　2 Sheets-Sheet 2
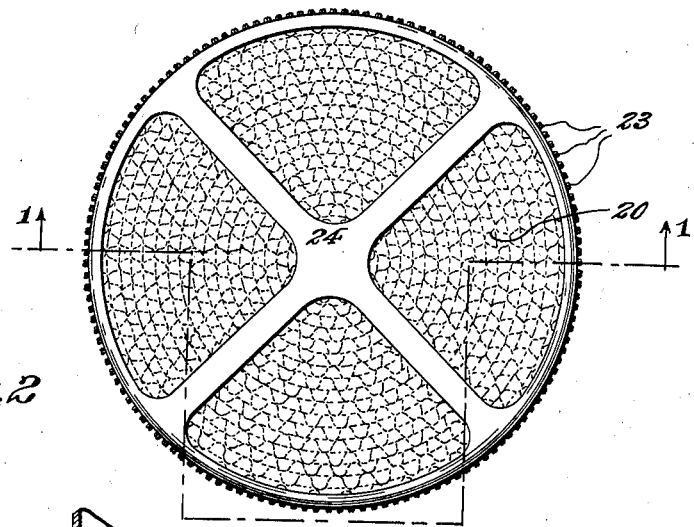
Fig.2
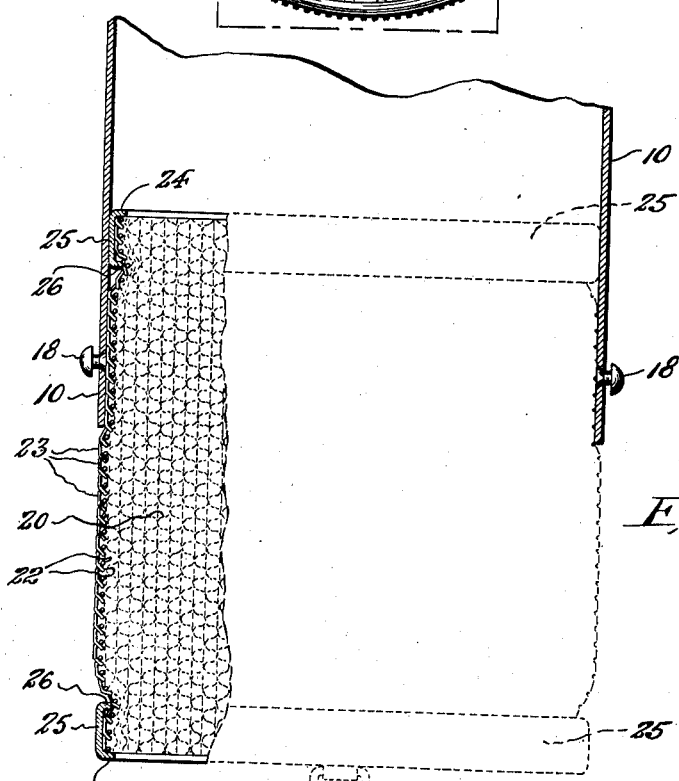
Fig.3
INVENTOR.
Alfred M. Goodloe,
BY George D. Richards
ATTORNEY.

Patented June 22, 1943

2,322,513

UNITED STATES PATENT OFFICE 2,322,513

REMOVABLE FILTER UNIT FOR AIR CLEANERS

Alfred M. Goodloe, Montclair, N. J., assignor to Metal Textile Corporation, West Orange, N. J., a corporation of Delaware Application February 10, 1942, Serial No. 430,193

5 Claims. (Cl. 183—49)

This invention relates to improvements in air cleaners, and, more particularly, to improvements in air cleaners of the oil bath type for cleaning air prior to delivery thereof to and through carburetors or fuel mixing means which serve internal combustion engines, or for cleaning air prior to the use thereof for other purposes.

Air cleaners of the oil bath type are equipped with an interstitial mass of filtering material through which the ingoing air is forced to pass, means being provided to bathe such filtering material with oil or other more or less viscous liquid, so that dust and other foreign particles suspended in the treated air will be caused to adhere to the filtering material, and thus will be separated and removed from the air stream flowing through the latter. In oil bath air cleaners as heretofore provided, the filtering material, which variously comprises a conglomerate body of fibrous or filamentary material, metallic filaments, crimped wire, wire mesh, knitted metallic fabric, or other material calculated to provide the required foraminous or interstitial mass, is directly packed into a compartment of the air cleaner casing or housing, so that desirable cleansing thereof from time to time, in situ, is both difficult and inefficient, while removal thereof, if attempted, so disintegrates or distorts its mass, as to require time and labor consuming reshaping and repacking operations, if not necessitating discarding of the same entirely and the substituting of new replacement material therefor.

Having these deficiencies in mind, it is an object of this invention to provide a novel construction of filter unit in the form of a unitary body which may be easily and quickly removed from the cleaner casing or housing, washed or otherwise cleaned, and as quickly and easily reinserted in the casing or housing after such cleansing.

The invention has for another object to provide a removable filter unit for the purposes described having a novel flexible foraminous and yet externally substantially smooth confining side wall structure which, due to its comparatively smooth exterior surface will slide easily into and out of a casing or housing compartment, and due to its flexibly yieldable quality will nevertheless snugly engage the casing or housing wall with a close fit, while due to its foraminous character will form with the filtering material confined thereby a functional part of the filter body.

The invention has for a further object to provide a removable filter unit having an exterior flexible, foraminous side wall structure comprising a sleeve of tubular knit wire mesh so characterized as to possess a comparatively rough interior surface to interlock with and frictionally bind the mass of filtering material enclosed therein against distortion of its mass or relative displacement of its constituent elements, while nevertheless possessing a relatively smooth exterior surface which will readily slidingly pass through the entrance opening of a casing or housing compartment without risk of obstruction or injury to itself. To this end, the sleeve of tubular knit wire mesh is so formed that the interlinking bights of the knitted loops lie along and project from the inner surface of the sleeve, thus providing the desired roughened interior face, while the legs of the knitted loops lie along the outer surface of the sleeve in a substantially continuous common plane, thus providing the desired smooth exterior face.

This invention has for a still further object to provide, in a removable filter unit characterized as above stated, perforate end elements having novel means for securely joining or interlocking the same in attached connected relation to the jacketed body of filtering material.

Other objects of this invention, not at this time more particularly enumerated, will be understood from the following detailed description of the same.

An illustrative embodiment of this invention is shown in the accompanying drawings, in which:

Fig. 2 is a top end view of the novel filter unit per se, removed from the air cleaner casing or housing.

Fig. 3 is a fragmentary sectional view of the filter body receiving compartment of the air cleaner, showing the novel filter unit in the process of being inserted therein, the latter being shown in part section and in part broken line elevation.

Similar characters of reference are employed in the above described views, to indicate corresponding parts.

Figure 1:
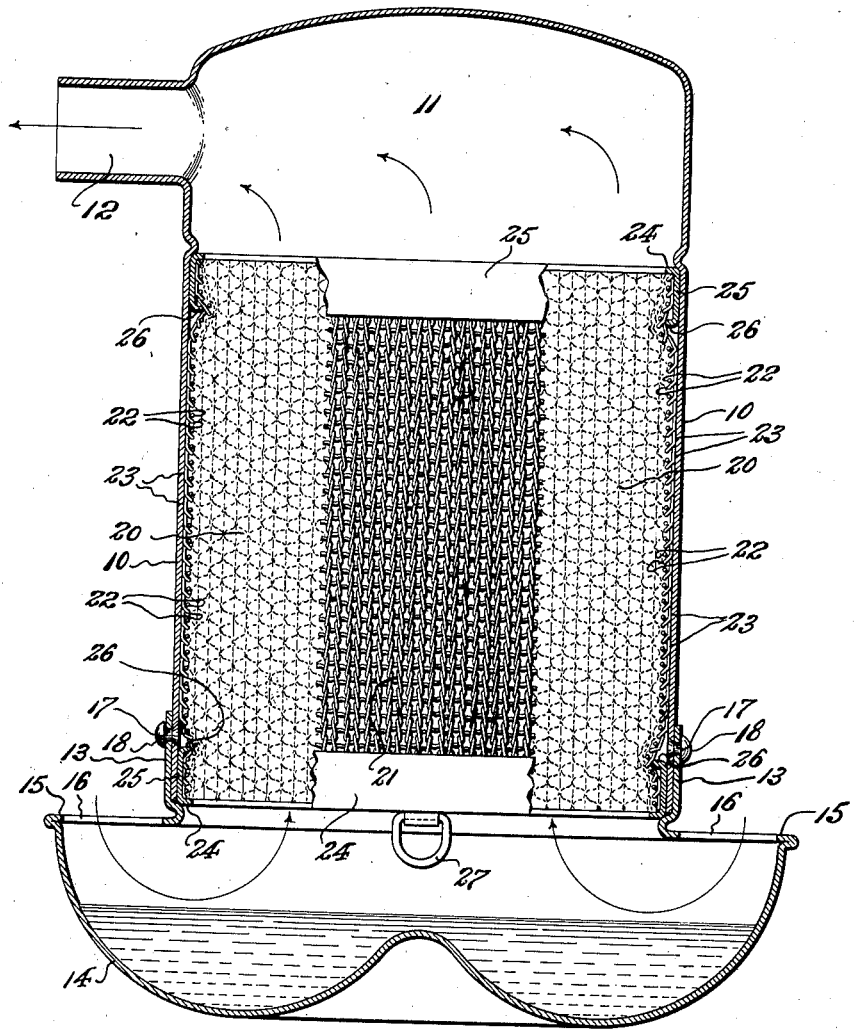
Fig. 1 is a vertical longitudinal sectional view of an exemplifying form of oil bath air cleaner, within which is operatively positioned the novel removable filter unit according to this invention, the latter being shown in part section taken on line 1—1 in Fig. 2 and in part elevation.

Air cleaners of the oil bath type are variously constructed, but essentially include a compartment to house the filter body, which compartment terminates in a suitable means for discharging the clean air issuing from one end of the filter body, and an oil reservoir opposed to the other end of the filter body, over the oil content of which ingoing air moves to pick up oil for wetting the filter body through which the air is compelled to pass.

An illustrative form of an oil bath air cleaner having the stated essential characteristics is shown in the accompanying drawings, the same comprising a cylindrical filter body receiving housing 10 open at its lower end, and terminating at its upper end in a clean air discharge chamber or collecting dome 11, from which extends a suitable discharge or outlet means 12; a suitable conduit means (not shown) being coupled with the latter.

Detachably connected with the open lower end portion of said housing 10, by a coupling collar 13 which telescopically engages thereover, is an oil reservoir basin 14, the annular top wall 15 of which, and which projects laterally beyond the sides of the housing 10, is provided with air intake openings 16. Said coupling collar 13 is detachably secured to the housing 10 by suitable means; illustratively by bayonet slots 17 formed in free marginal portions thereof, and adapted to receive and operatively engage studs 18 which project exteriorly from the walls of said housing 10.

The removable filter unit according to this invention comprises a filter body 20 which may consist of an aggregation of fibrous or filamentary material, metallic filaments, crimped wire, wire mesh, knitted metallic fabric, or other material calculated to provide the required foraminous or interstitial mass. A preferred form, the filter body 20 is formed by a multiplicity of superposed layers of knitted wire mesh fabric. In a preferred filter body structure formed from knitted wire mesh fabric, either warp or tubular knit mesh, which may optionally be knitted from round or flat wire or wire of any other desired cross-sectional shape, is first flattened into strip or sheet form of suitable width, and is then corrugated or crimped so that the corrugations extend obliquely across the width of the strip or sheet from one longitudinal edge thereof to the other. Corrugate strips or sheets of the knitted metallic mesh are superposed in such manner that the corrugations of one are disposed to cross those of the other. Layers of thus superposed corrugate knitted metallic mesh are built up into a filter body mass of desired size and shape. Illustratively, the superposed corrugate knitted metallic mesh strips or sheets are rolled upon themselves into a cylindrical body form of required length and diameter to fill the lower portion of the housing 10 below the air discharge chamber or collecting dome 11. The filter body 20, when constructed in the above described preferred manner, provides a porous or interstitial filter body mass. In such preferred form of filter body 20, the interstices will be substantially uniformly distributed throughout the body mass, and the interstices may be optionally modified in size by using a knitted fabric of selected mesh size, and by forming therein corrugations of selected size and depth, all whereby a porous or interstitial body of desired density is provided.

The filter body 20 is enclosed in a one-piece flexible, foraminous side wall structure, the same being formed by a sleeve 21 of tubular knit metallic wire mesh. Said sleeve is so knit and formed that the interlinking bights 22 of the knitted loops lie along and project from the inner surface of the sleeve, thus providing a desired roughened interior face, while the legs 23 of the knitted loops lie along the outer surface of the sleeve in a substantial continuous common plane, thus providing a desired relatively smooth exterior face. The sleeve 21 is drawn longitudinally over the filter body 20, so as to be disposed around and in enclosing relation to the sides of the latter. When the sleeve is so related to the filter body, the projecting interlinked bights 22 of the knitted loops which lie along the inner surface of the sleeve will interlock with the rough exterior surface of said filter body 20, whereby the sleeve 21 and filter body 20 will be frictionally bound together, so that the sleeve functions to hold or support the filter body mass against distortion, and especially against axial displacement of its constituent layers or plies.

After the filter body 20 and the enclosing side wall forming sleeve have been assembled, the assembly is provided with perforate end elements. These end elements each comprise a perforate sheet metal end plate 24 of spider-like formation, from the peripheral margins of which extend annular collar flanges 25. Said collar flanges 25 are telescopically engaged over the respective end portions of the filter body and sleeve assembly, whereupon the free marginal portions of said collar flanges 25 are in-turned to form annular inwardly projecting gripping lips 26 which imbed themselves in the sides of the assembly, thus securely uniting the end elements respectively to and across the upper and lower ends of the assembly, and thereby forming a unitary structure which provides a filter unit well adapted to be easily and quickly bodily inserted into or removed from the receiving housing 10 of an oil bath air cleaner.

The filter body and sleeve assembly is sized to be slightly greater in diameter than the inside diameter of the receiving space of the housing 10 in which it is to be lodged, but since the tubular knit sleeve 21 possesses a relatively smooth surface as described and is yieldably flexible, the same will not only slide easily through the open lower end of the housing 10 without undue resistance, obstruction or risk of injury thereto, but will also flex and yield compressively, together with the filter body mass, so that the unit will snugly and frictionally abut against the interior wall surfaces of the housing 10 in manner to be self-supporting therein; and, furthermore, since the sleeve is itself of foraminous character, the same will functionally cooperate with the filter body per se, i. e. will combine therewith as part of the interstitial mass thereof.

In order to facilitate handling of the filter unit, especially for withdrawing the same from the housing 10, the lower end plate 24 thereof may be provided with a suitable fingerpiece, such e. g. as the handle-loop 27 dependently affixed thereto.

It will be obvious that access to the interior of the filter unit housing 10 may be had by disconnecting and removing the oil reservoir basin 14 therefrom, whereupon the filter unit may be inserted within the housing, or withdrawn therefrom for cleansing, as the case may be.

It will be understood that some changes could be made and that apparently widely different embodiments of this invention could be made without departing from the scope thereof, as defined in the following claims. It is therefore intended that all matter contained in the above description or shown in the accompanying drawings shall be interpreted as illustrative and not in a limiting sense.